(12) United States Patent
Ishihara et al.

(10) Patent No.: US 10,431,027 B2
(45) Date of Patent: Oct. 1, 2019

(54) VEHICLE COMMUNICATION SYSTEM, VEHICLE-MOUNTED DEVICE, AND PORTABLE DEVICE

(71) Applicants: Naoyuki Ishihara, Aichi (JP); Yosuke Tomita, Aichi (JP); Tetsuo Nishidai, Aichi (JP); Takahiro Inaguma, Aichi (JP); Kazuya Hamada, Aichi (JP); Hirofumi Ohata, Aichi (JP)

(72) Inventors: Naoyuki Ishihara, Aichi (JP); Yosuke Tomita, Aichi (JP); Tetsuo Nishidai, Aichi (JP); Takahiro Inaguma, Aichi (JP); Kazuya Hamada, Aichi (JP); Hirofumi Ohata, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 0 days.

(21) Appl. No.: 15/715,822

(22) Filed: Sep. 26, 2017

(65) Prior Publication Data

US 2018/0089919 A1    Mar. 29, 2018

(30) Foreign Application Priority Data

Sep. 26, 2016  (JP) .................................. 2016-187461

(51) Int. Cl.
*G07C 9/00* (2006.01)
*G08C 17/02* (2006.01)
*H04W 12/06* (2009.01)

(52) U.S. Cl.
CPC ......... *G07C 9/00309* (2013.01); *G08C 17/02* (2013.01); *H04W 12/06* (2013.01); *B60R 2325/105* (2013.01); *B60R 2325/202* (2013.01); *G07C 2009/00357* (2013.01); *G07C 2009/00555* (2013.01)

(58) Field of Classification Search
None
See application file for complete search history.

(56) References Cited

U.S. PATENT DOCUMENTS

2012/0139691 A1*  6/2012  Mori ....................... B60R 25/24
                                                                         340/5.2

FOREIGN PATENT DOCUMENTS

JP        2012-144905 A       6/2012
JP        2012-167446 A       9/2012

* cited by examiner

*Primary Examiner* — Thomas C McCormack
(74) *Attorney, Agent, or Firm* — Osha Liang LLP

(57) ABSTRACT

A vehicle communication system includes a vehicle-mounted device and a portable device. In the vehicle communication system, a transmission unit transmits a first to third radio signals having intensities weaker in this order, a measurement unit measures an intensity of each of the radio signals, and a determination unit that determines whether an intensity difference between any two of the radio signals among the radio signals measured by the measurement unit is larger than a threshold value. Control of a target mounted on the vehicle is permitted if the intensity difference is larger than the threshold value.

3 Claims, 9 Drawing Sheets

FIG. 8
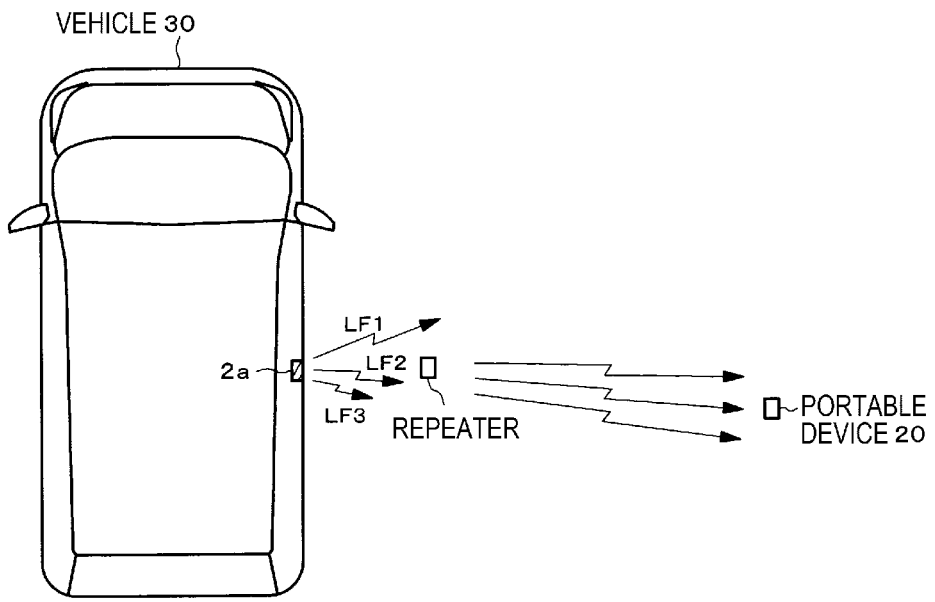
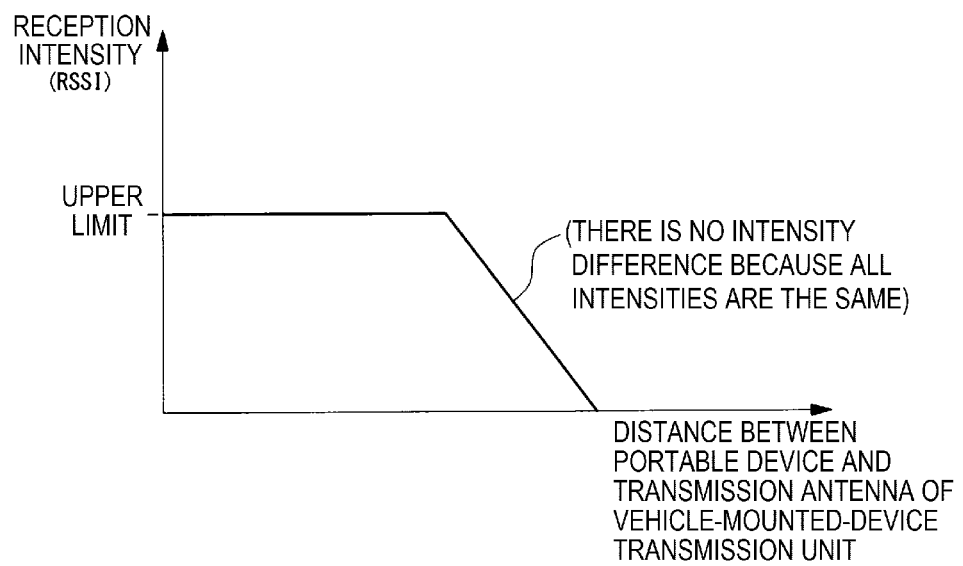

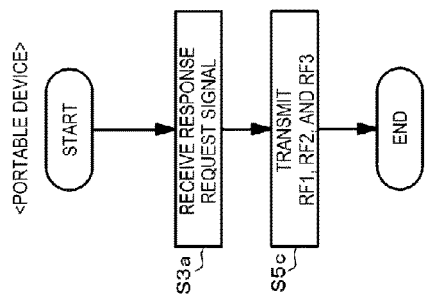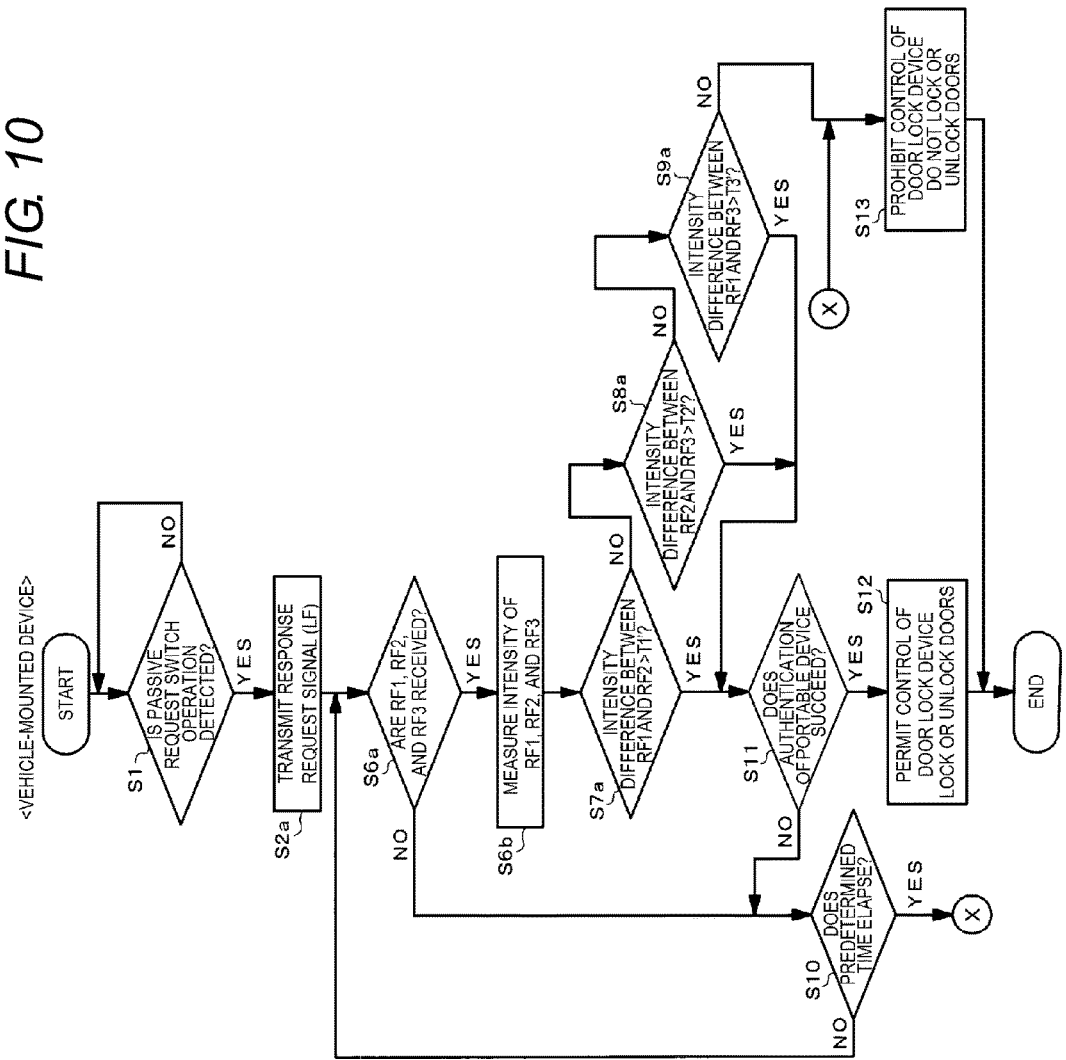
FIG. 10

VEHICLE COMMUNICATION SYSTEM, VEHICLE-MOUNTED DEVICE, AND PORTABLE DEVICE

CROSS-REFERENCES TO RELATED APPLICATIONS

This application is based upon and claims the benefit of priority from Japanese Patent Application No. 2016-187461, filed on Sep. 26, 2016, the entire contents of which are incorporated herein by reference.

FIELD

One or more embodiments of the present invention relate to a vehicle communication system in which an operation of a target mounted on a vehicle is permitted or prohibited based on a radio signal transmitted or received between a vehicle-mounted device mounted on the vehicle and a portable device carried by a user of the vehicle.

BACKGROUND

There is a vehicle communication system in which an operation of a target mounted on a vehicle such as locking or unlocking of doors of the vehicle is permitted or prohibited based on a radio signal transmitted or received between a vehicle-mounted device mounted on the vehicle and a portable device carried by a user of the vehicle. This vehicle communication system is provided to improve security in the vehicle such as an automobile and convenience of the user.

The vehicle-mounted device and the portable device respectively include a transmission unit and a reception unit which transmit and receive a radio signal. The transmission unit of the vehicle-mounted device transmits a response request signal outside or inside of the vehicle. When the portable device approaches the vehicle up to a communicable distance, the reception unit of the portable device receives a response request signal transmitted by the transmission unit of the vehicle-mounted device and the transmission unit of the portable device returns a response signal. When the reception unit of the vehicle-mounted device receives the response signal, the vehicle-mounted device authenticates the portable device using an ID (identification information) included in the response signal, and when the authentication succeeds, the vehicle-mounted device locks or unlocks doors of the vehicle.

However, a response request signal transmitted from a vehicle-mounted control device is relayed by a repeater and is received by a portable device in the distance, a wrong communication act of disguising as if the portable device is in a periphery of the vehicle may be performed. The wrong communication act using the repeater is called a relay attack. By the relay attack, a malicious third party who is not an owner of the vehicle may commit a crime such as theft by unlocking a door of the vehicle or starting an engine.

Therefore, as an anti-crime measure against the relay attack, for example, in JP-A-2012-144905, two radio signals having different signal intensities are transmitted from the vehicle-mounted device and reception intensities of both of the radio signals are measured by the portable device. In a case where a difference between the reception intensities of the two radio signals is larger than a threshold value, control of a target is permitted. In a case where the difference between the reception intensities of the two radio signals is equal to or smaller than the threshold value, it is determined that there is a wrong communication using a repeater and the control of the target is prohibited. In the repeater used for the relay attack, the two radio signals transmitted from the vehicle-mounted device are relayed, but intensities of the radio signals cannot be reproduced. For this reason, in a case where the relay attack is performed, a difference between the reception intensities of the two radio signals measured by the portable device does not occur and the difference is equal to or smaller than a threshold value, and thus it is determined that a wrong communication using the repeater and the control of the target can be prohibited.

However, when the two radio signals having different intensities are transmitted from the vehicle-mounted device, if the portable device moves, a difference occurs in the reception intensities of the two radio signals measured by the portable device despite the relay attack being performed and security is decreased. In JP-A-2012-144905, as a measure, a transmission time interval of the two radio signals from the vehicle-mounted device is set so that the difference between the intensities of the two radio signals is equal to or smaller than the threshold value.

In addition, the reception intensity of the radio signal measured by the portable device becomes larger as the portable device approaches the vehicle-mounted device, but the reception intensity is saturated at a certain value. That is, since a reception intensity which can be measured by the portable device has an upper limit, when the portable device approaches the vehicle-mounted device close to more than a predetermined distance, even if the two radio signals having different intensities are transmitted from the vehicle-mounted device, but a difference does not occur in the reception intensities of the two radio signals measured by the portable device. For this reason, the control of the target is not permitted and convenience of a user is decreased.

On the other hand, in JP-A-2012-167446, a first measurement signal of which an intensity is "large" and a second measurement signal of which an intensity is "medium" are transmitted from the vehicle-mounted device. In a case where a reception intensity difference between both of the measurement signals measured by the portable device is equal to or smaller than a threshold value, the first measurement signal and a third measurement signal of which an intensity is "small" are transmitted from the vehicle-mounted device. By setting the intensity of the third measurement signal smaller than an upper limit of a reception intensity measurable by the portable device, a difference certainly occurs in the reception intensities of the first measurement signal and the third measurement signal.

SUMMARY

In the related art, in addition to improving security against the relay attack, in order to improve convenience of a user when the portable device approaches the vehicle-mounted device, a process, in which two radio signals having different intensities are transmitted, the intensity of each of the radio signals is measured, and a difference between the intensities is compared with a threshold value, is performed and the process is performed again. However, since it takes time to retry each of the processes one more time, communication responsiveness between the vehicle-mounted device and the portable device is decreased.

An object of one or more embodiments of the invention is to improve security against a relay attack and convenience of a user and communication responsiveness in a vehicle communication system that includes a vehicle-mounted device and a portable device.

According to an embodiment of the present invention, there is provided a vehicle communication system including: a vehicle-mounted device mounted on a vehicle; and a portable device carried by a user of the vehicle, wherein control of a target mounted on the vehicle is permitted or prohibited based on a radio signal transmitted or received between the vehicle-mounted device and the portable device. The vehicle communication system includes: a transmission unit that is provided on one of the vehicle-mounted device and the portable device and performs transmission of a first radio signal, a second radio signal having an intensity weaker than that of the first radio signal, and a third radio signal having an intensity weaker than that of the second radio signal; and a measurement unit that is provided on the other of the vehicle-mounted device and the portable device and measures an intensity of each of the radio signals transmitted from the transmission unit. The vehicle communication system further includes a determination unit that is provided on the vehicle-mounted device or the portable device and determines whether or not an intensity difference between any two of the radio signals among the radio signals measured by the measurement unit is larger than a threshold value. In the vehicle communication system, control of the target is permitted in a case where any one of following conditions is satisfied: a first condition in which an intensity difference between the first radio signal and the second radio signal is larger than a first threshold value, a second condition in which an intensity difference between the second radio signal and the third radio signal is larger than a second threshold value, and a third condition in which an intensity difference between the first radio signal and the third radio signal is larger than a third threshold value.

As stated above, the first radio signal, the second radio signal having the intensity weaker than that of the first radio signal, and the third radio signal having the intensity weaker than that of the second radio signal are transmitted from one of the vehicle-mounted device and the portable device and the intensity of each of the radio signals is measured by the other of the vehicle-mounted device and the portable device. In a case where an intensity difference between any two of the radio signals is larger than the threshold value, control of the target is permitted. For this reason, in a case where a relay attack is performed, there is no difference between any two of intensities of the radio signals, and thus the control of the target is not permitted and it is possible to improve security. In addition, even in a case where the portable device approaches the vehicle-mounted device, there is a difference between any two of intensities of the radio signals among the first radio signal, the second radio signal, and the third radio signal. Since the intensity difference is larger than a threshold value, the control of the target is permitted and it is possible to improve convenience of the user. Further, since the first radio signal, the second radio signal, and the third radio signal are transmitted, an intensity of each of the radio signals is measured, and the difference between any two of the intensities of the radio signals is compared with a threshold value, after a series of the processes is performed once, it is possible to improve communication responsiveness between the vehicle-mounted device and the portable device without performing (retrying) the processes again.

In the vehicle communication system according to the embodiment of the invention, the determination unit may first determine whether or not the intensity difference between the first radio signal and the second radio signal is larger than the first threshold value, and if the intensity difference between the first radio signal and the second radio signal is not larger than the first threshold value, then determine whether or not the intensity difference between the second radio signal and the third radio signal is larger than the second threshold value or whether or not the intensity difference between the first radio signal and the third radio signal is larger than the third threshold value.

In the vehicle communication system according to the embodiment of the invention, if it is determined that the intensity difference between the first radio signal and the second radio signal is not larger than the first threshold value, the determination unit then determines whether or not the intensity difference between the second radio signal and the third radio signal is larger than the second threshold value, and if it is determined that the intensity difference between the second radio signal and the third radio signal is not larger than the second threshold value, the determination unit then determines whether or not the intensity difference between the first radio signal and the third radio signal is larger than the third threshold value.

According to another embodiment of the present invention, there is provided a vehicle-mounted device mounted on a vehicle and permits or prohibits control of a target mounted on the vehicle based on a radio signal transmitted or received to or from a portable device carried by a user of the vehicle. The vehicle-mounted device includes: a vehicle-mounted-device transmission unit that performs transmission of a first radio signal, a second radio signal having an intensity weaker than that of the first radio signal, and a third radio signal having an intensity weaker than that of the second radio signal; a vehicle-mounted-device reception unit that receives, from the portable device, a response signal containing an intensity of each of the radio signals measured when the portable device receives each of the radio signals; and a determination unit that determines whether or not an intensity difference between any two of the radio signals among the radio signals contained in the response signal is larger than a threshold value. In the vehicle-mounted device, control of the target is permitted in a case where any one of following conditions is satisfied: a first condition in which an intensity difference between the first radio signal and the second radio signal is larger than a first threshold value, a second condition in which an intensity difference between the second radio signal and the third radio signal is larger than a second threshold value, and a third condition in which an intensity difference between the first radio signal and the third radio signal is larger than a third threshold value.

In the vehicle-mounted device according to the embodiment of the invention, the determination unit may be included in the portable device. In this case, the vehicle-mounted device receives a determination result of the determination unit transmitted from the portable device by the vehicle-mounted-device reception unit.

According to still another embodiment of the present invention, there is provided a portable device carried by a user of a vehicle and transmits and receives a radio signal for permitting or prohibiting an operation of a target mounted on the vehicle to and from a vehicle-mounted device mounted on the vehicle. The portable device includes: a measurement unit that measures intensities of a first radio signal, a second radio signal having an intensity weaker than that of the first radio signal, and a third radio signal having an intensity weaker than that of the second radio signal, when the first radio signal, the second radio signal and the third radio signal transmitted from the vehicle-mounted device are received; and a portable-device transmission unit that transmits, to the vehicle-mounted device, a response signal including information for permitting control of the target or a response signal including a measurement result of the measurement unit in a case where any one of following conditions is satisfied: a first condition in which an intensity difference between the first radio signal and the second radio signal is larger than a first threshold value, a second condition in which an intensity difference between the second radio signal and the third radio signal is larger than a second threshold value, and a third condition in which an intensity difference between the first radio signal and the third radio signal is larger than a third threshold value.

The portable device according to the embodiment of the invention, further includes: a determination unit that determines whether or not each of the conditions is satisfied, in which the portable-device transmission unit may transmit the response signal including a determination result of the determination unit to the vehicle-mounted device.

According to one or more embodiments of the invention, in a vehicle communication system that includes the vehicle-mounted device and the portable device, it is possible to improve security against a relay attack and convenience of a user and communication responsiveness when the portable device approaches the vehicle-mounted device.

BRIEF DESCRIPTION OF THE DRAWINGS

FIG. 8 is a diagram illustrating a communication state of the vehicle-mounted device and the portable device in FIG. 1 and a reception intensity of a response request signal measured by the portable device;

FIG. 10 is a flowchart illustrating an operation of a vehicle-mounted device and a portable device according to Embodiment 3.

DETAILED DESCRIPTION

Figure 1:
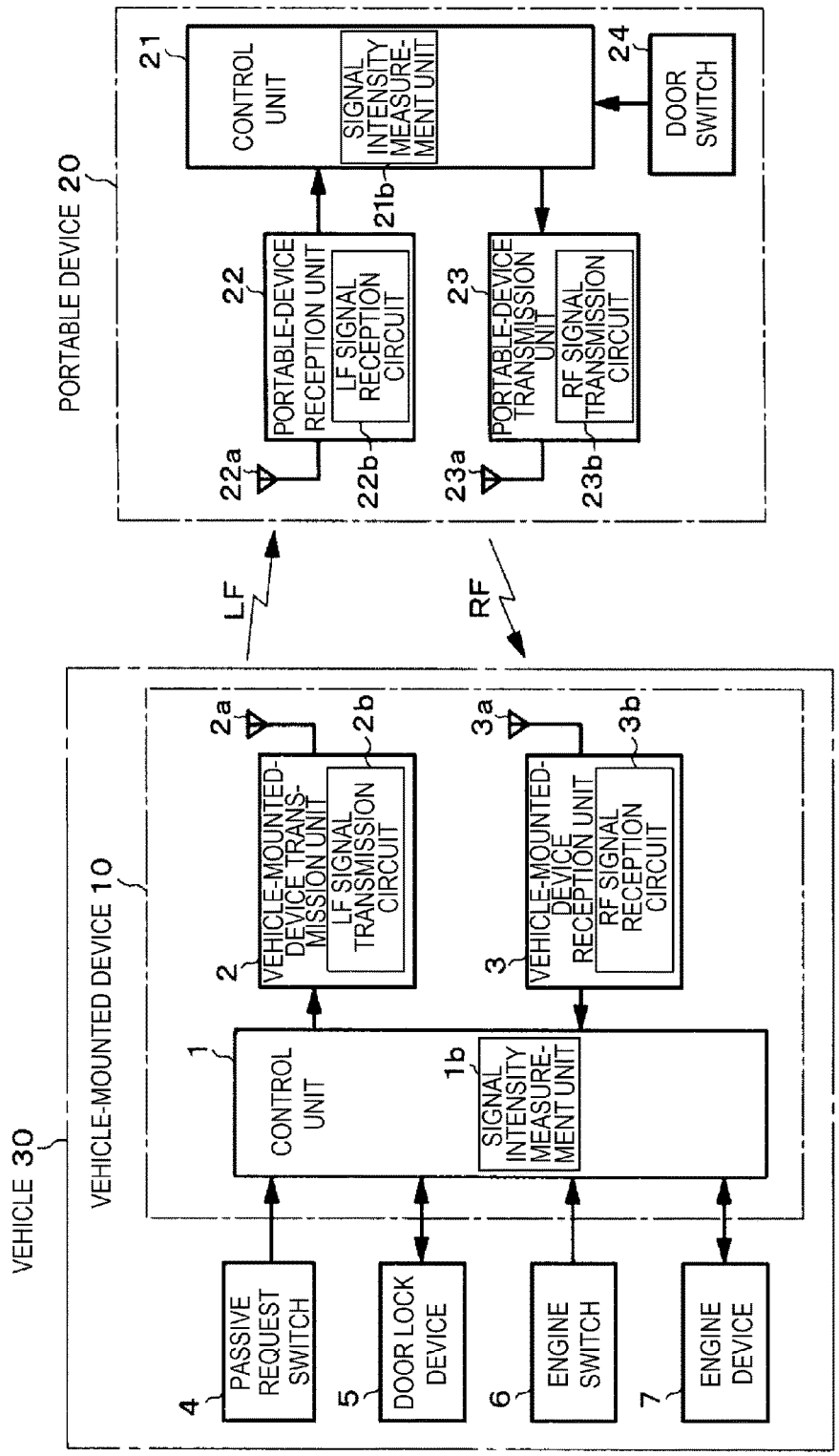
FIG. 1 is a configuration diagram of a vehicle communication system according to an embodiment of the present invention.

In embodiments of the invention, numerous specific details are set forth in order to provide a thorough understanding of the invention. However, it will be apparent to one of ordinary skill in the art that the invention may be practiced without these specific details. In other instances, well-known features have not been described in detail to avoid obscuring the invention.

Hereinafter, one or more embodiment of the present invention will be described with reference to the drawings. In the respective drawings, the same portions or corresponding portions will be assigned the same reference numeral.

Initially, a configuration of a vehicle communication system 100 according to the embodiment will be described with reference to FIGS. 1 to 4.

Figure 2:
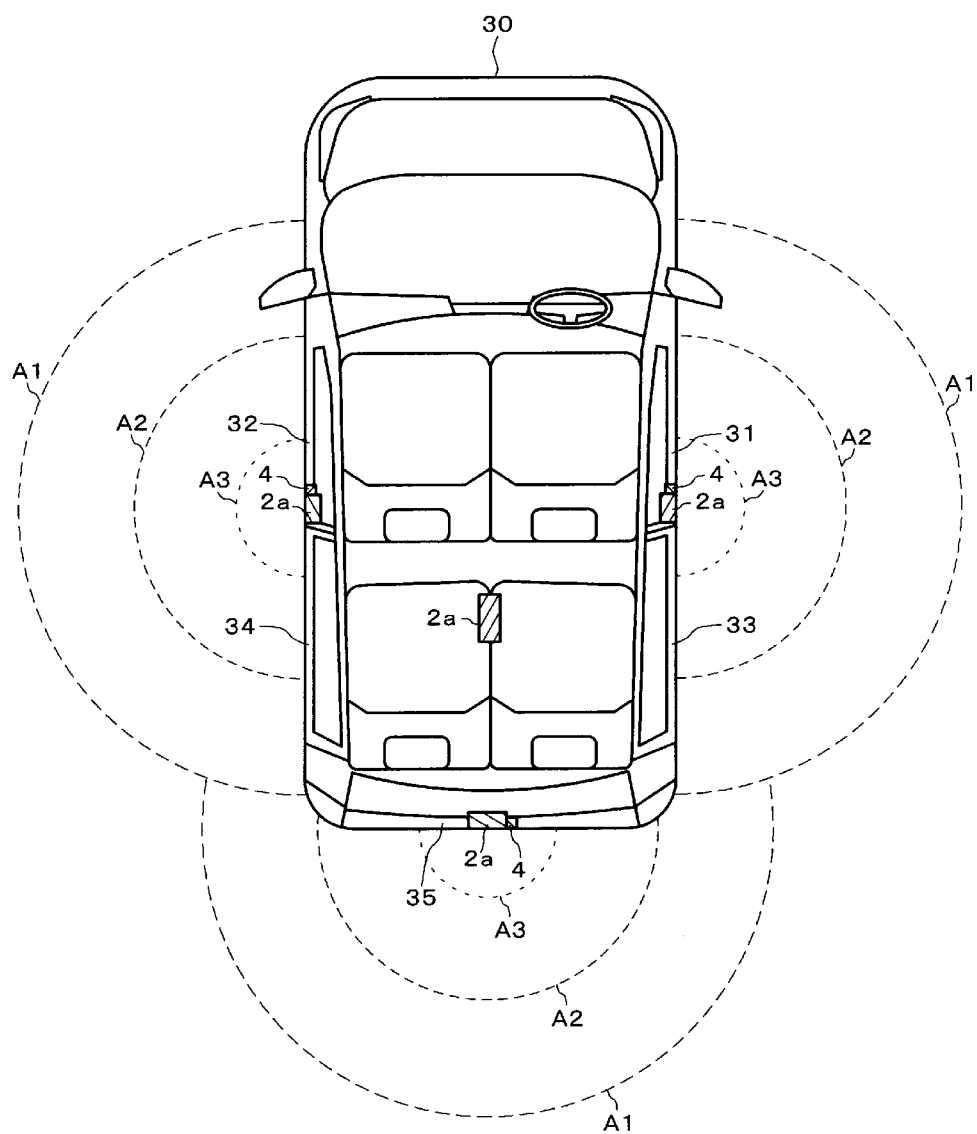
FIG. 2 is a diagram illustrating a wireless communication range of a vehicle on which the vehicle communication system in FIG. 1 is mounted.

FIG. 1 is a configuration diagram of the vehicle communication system 100. FIG. 2 is a diagram illustrating a wireless communication range of a vehicle 30 on which the vehicle communication system 100.

The vehicle communication system 100 includes a vehicle-mounted device 10 mounted on the vehicle 30 and a portable device 20 carried by a user. The vehicle 30 is configured with an automatic four-wheeled vehicle as illustrated in FIG. 2.

In the vehicle communication system 100, control of a target mounted on the vehicle 30 is permitted or prohibited based on a radio signal transmitted or received between the vehicle-mounted device 10 and the portable device 20. Specifically, as the target, control of a door lock device 5 (FIG. 1) which locks or unlocks doors of the vehicle 30 is permitted or prohibited.

The vehicle-mounted device 10 includes a control unit 1, a vehicle-mounted-device transmission unit 2, and a vehicle-mounted-device reception unit 3. The control unit 1 is configured to include a CPU, a memory, and the like. The control unit 1 includes a signal intensity measurement unit 1*b*.

The vehicle-mounted-device transmission unit 2 includes a transmission antenna 2*a* and a LF signal transmission circuit 2*b*. The vehicle-mounted-device transmission unit 2 is provided in plural number at the vehicle 30 (only one illustrated in FIG. 1).

Transmission antennas 2*a* of vehicle-mounted-device transmission units 2 are respectively provided in, for example, as illustrated in FIG. 2, a door 31 of a driving seat of the vehicle 30, a door 32 of a passenger seat, a back door 35, and an inside of a vehicle compartment.

Among the vehicle-mounted-device transmission units 2, the vehicle-mounted-device transmission unit 2 including the transmission antenna 2*a* provided in the doors 31, 32, and 35 generates a radio signal of a low frequency (LF; long-wave) bandwidth using the LF signal transmission circuit 2*b* and transmits the radio signal from each of the transmission antennas 2*a* to the portable device 20 present outside of the vehicle compartment. The vehicle-mounted-device transmission unit 2 including the transmission antenna 2*a* provided inside the vehicle compartment generates a radio signal of the LF bandwidth using the LF signal transmission circuit 2*b* and transmits the radio signal from the transmission antenna 2*a* to the portable device 20 present inside of the vehicle compartment.

The radio signal transmitted by the vehicle-mounted-device transmission unit 2 includes a response request signal for requesting a response from the portable device 20. The response request signal includes data such as a unique ID (identification information) of the vehicle-mounted device 10 and the like.

The control unit 1 in FIG. 1 switches an intensity of the response request signal into three levels of "large", "medium", and "small". The control unit 1 transmits a first response request signal of which an intensity is "large", a second response request signal of which an intensity is "medium", and a third response request signal of which an intensity is "small" by each of the vehicle-mounted-device transmission units 2. That is, the first response request signal has the highest intensity, the intensity of the second response request signal is weaker than the intensity of the first response request signal, and the intensity of the third response request signal is weaker than the intensity of the second response request signal.

For this reason, as illustrated in FIG. 2, outside the vehicle compartment of the vehicle 30, a range A2 within which the portable device 20 can receive the second response request signal is narrower than a range A1 within which the portable device 20 can receive the first response request signal. In addition, a range A3 within which the portable device 20 can receive the third response request signal is narrower than a range A2 within which the portable device 20 can receive the second response request signal.

The vehicle-mounted-device transmission unit 2 is an example of "transmission unit" of one or more embodiments of the invention. The first response request signal is an example of "first radio signal" of one or more embodiments of the invention. The second response request signal is an example of "second radio signal" of one or more embodiments of the invention. The third response request signal is an example of "third radio signal" of one or more embodiments of the invention.

The vehicle-mounted-device reception unit 3 includes a reception antenna 3*a* and a RF signal reception circuit 3*b*. The vehicle-mounted-device reception unit 3 receives a radio signal with a radio frequency (RF; high frequency) bandwidth, transmitted from the portable device 20, by the reception antenna 3*a* and the RF signal reception circuit 3*b*. The signal intensity measurement unit 1*b* of the control unit 1 measures an intensity of the radio signal received by the vehicle-mounted-device reception unit 3.

The control unit 1 controls the vehicle-mounted-device transmission unit 2 and the vehicle-mounted-device reception unit 3, wirelessly communicates with the portable device 20, and transmits or receives a signal or information to or from the portable device 20. In addition, the control unit 1 switches an intensity of a response request signal transmitted by each of the vehicle-mounted-device transmission units 2.

A passive request switch 4 is connected to the control unit 1 of the vehicle-mounted device 10. The passive request switch 4 is provided in the vehicle 30 in plural number. Specifically, as illustrated in FIG. 2, the passive request switches 4 are provided at an outer knob of the door 31 of the driving seat of the vehicle 30, an outer knob of the door 32 of the passenger seat, and an outer knob of the back door 35. A user of the vehicle 30 approaches or touches any one of the outer knobs of the doors 31, 32, and 35, and thus, the passive request switches 4 are operated (switched from OFF to ON).

As another example, the passive request switch 4 may be provided at a right door 33 or a left door 34 of a back seat of the vehicle 30.

The door lock device 5 in FIG. 1 is connected to the control unit 1 of the vehicle-mounted device 10. The door lock device 5 is a mechanism for locking or unlocking each of the doors 31 to 35 of the vehicle 30 and is configured with a driving circuit of the mechanism. The control unit 1 controls the door lock device 5 so that each of the doors 31 to 35 is locked or unlocked.

An engine switch 6 and an engine device 7 are connected to the control unit 1 of the vehicle-mounted device 10. The engine switch 6 is provided at a periphery of the driving seat inside the vehicle compartment of the vehicle 30. Based on an operation of the engine switch 6, the engine device 7 starts or stops an engine of the vehicle 30.

The portable device 20 is configured with a key FOB. The portable device 20 includes a control unit 21, a portable-device reception unit 22, a portable-device transmission unit 23, and a door switch 24. The control unit 21 is configured to include a CPU, a memory, and the like. The control unit 21 includes a signal intensity measurement unit 21*b*. The signal intensity measurement unit 21*b* may be provided at the portable-device reception unit 22.

The portable-device reception unit 22 includes a reception antenna 22*a* and a LF signal reception circuit 22*b*. The portable-device reception unit 22 receives a radio signal with the LF bandwidth by the reception antenna 22*a* and the LF signal reception circuit 22*b*. The radio signal received by the portable-device reception unit 22 includes the first response request signal, the second response request signal, and the third response request signal described above.

The signal intensity measurement unit 21*b* of the control unit 21 measures an intensity (RSSI value) of each of the response request signals received by the portable-device reception unit 22. The signal intensity measurement unit 21*b* is an example of "measurement unit" of one or more embodiments of the invention.

Figure 3:
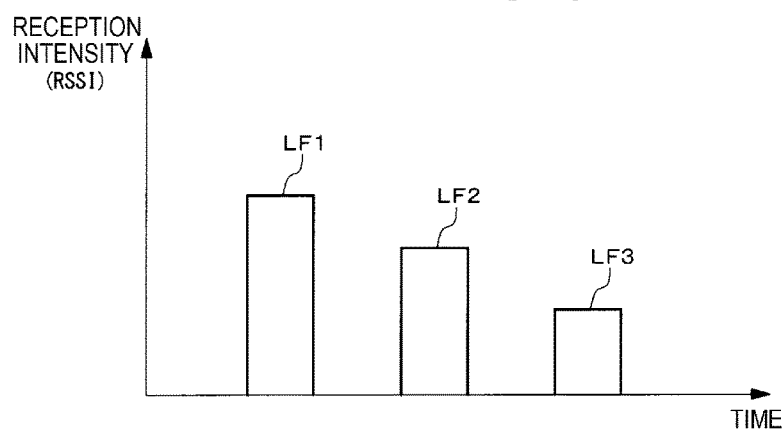
FIG. 3 is a diagram illustrating a reception intensity of a response request signal measured by a portable device in FIG. 1.

FIG. 3 is a diagram illustrating a reception intensity of a response request signal measured by the signal intensity measurement unit 21*b* of the portable device 20. For example, the vehicle-mounted-device transmission unit 2 transmits a first response request signal LF1, a second response request signal LF2, and a third response request signal LF3 in order of the first response request signal LF1, the second response request signal LF2, and the third response request signal LF3. In this case, each of the response request signals is received by the portable-device reception unit 22 in order of the first response request signal LF1, the second response request signal LF2, and the third response request signal LF3 and the signal intensity measurement unit 21*b* measures a reception intensity of each of the response request signals.

As described above, the intensity of each of the response request signals transmitted by the vehicle-mounted-device transmission unit 2 is weakened in order of the first response request signal LF1, the second response request signal LF2, and the third response request signal LF3. For this reason, as illustrated in FIG. 3, a reception intensity of each of the response request signals measured by the portable device 20 is also weakened in order of the first response request signal LF1 received firstly, the second response request signal LF2 received next, the third response request signal LF3 received lastly.

Figure 4:
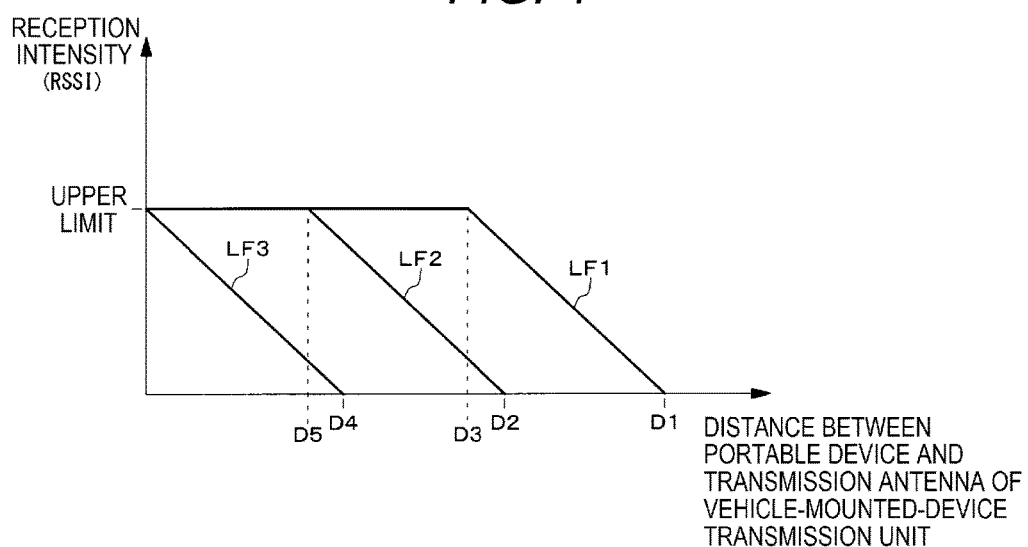
FIG. 4 is a diagram illustrating a relationship between a distance between a portable device and a transmission antenna of a vehicle-mounted-device transmission unit in FIG. 1 and a reception intensity of a response request signal measured by the portable device.

FIG. 4 is a diagram illustrating a relationship between a distance between the portable device 20 and the transmission antenna 2*a* of the vehicle-mounted-device transmission unit 2 and a reception intensity of a response request signal measured by the signal intensity measurement unit 21*b* of the portable device 20.

As illustrated in FIG. 4, a timing at which the portable-device reception unit 22 receives each of the response request signals LF1, LF2, and LF3 and the signal intensity measurement unit 21*b* starts to measure an intensity of each of the response request signals LF1, LF2, and LF3 is different according to a distance (hereinafter, referred to as "separation distance") between the portable device 20 and the transmission antenna 2*a* of the vehicle-mounted-device transmission unit 2. Specifically, a separation distance D2 when the signal intensity measurement unit 21*b* starts to measure an intensity of the second response request signal LF2 is shorter than a separation distance D1 when the signal intensity measurement unit 21b starts to measure an intensity of the first response request signal LF1 (D1>D2). In addition, a separation distance D4 when the signal intensity measurement unit 21b starts to measure an intensity of the third response request signal LF3 is shorter than the separation distance D2 when the signal intensity measurement unit 21b starts to measure an intensity of the second response request signal LF2 (D2>D4).

The intensity of each of the response request signals LF1, LF2, and LF3 measured by the signal intensity measurement unit 21b becomes stronger as the portable device 20 approaches the transmission antenna 2a. However, an intensity of a radio signal which can be measured by the signal intensity measurement unit 21b has an upper limit. For this reason, if the portable device 20 approaches the transmission antenna 2a to a distance equal to or less than a predetermined distance D3, a reception intensity of the first response request signal LF1 measured by the portable device 20 is saturated at an upper limit value. Further, if the portable device 20 approaches the transmission antenna 2a to a distance equal to or less than a predetermined distance D5, a reception intensity of the second response request signal LF2 measured by the portable device 20 is also saturated at the upper limit value. The distance D3 is longer than the distance D5 (D3>D5).

Transmission intensities of the first response request signal LF1 and the second response request signal LF2 transmitted by the vehicle-mounted-device transmission unit 2 are set so that the separation distance D2 when the signal intensity measurement unit 21b starts to measure an intensity of the second response request signal LF2 is longer than the distance D3 when a reception intensity of the first response request signal LF1 measured by the portable device 20 is saturated at the upper limit value.

In addition, transmission intensities of the second response request signal LF2 and the third response request signal LF3 transmitted by the vehicle-mounted-device transmission unit 2 are set so that the separation distance D4 when the signal intensity measurement unit 21b starts to measure an intensity of the third response request signal LF3 is longer than the distance D5 when a reception intensity of the second response request signal LF2 measured by the portable device 20 is saturated at the upper limit value.

Further, a transmission intensity of the third response request signal LF3 transmitted by the vehicle-mounted-device transmission unit 2 is set so that a reception intensity of the third response request signal LF3 measured by the portable device 20 is not saturated at the upper limit (does not reach the upper limit) even if the portable device 20 approaches the transmission antenna 2a to an extremely short distance (approximately 0).

In FIG. 1, the portable-device transmission unit 23 includes a transmission antenna 23a and a RF signal transmission circuit 23b. The portable-device transmission unit 23 transmits a radio signal with the RF bandwidth generated by the RF signal transmission circuit 23b from the transmission antenna 23a to the vehicle-mounted device 10. The radio signal (RF signal) transmitted by the portable-device transmission unit 23 includes a response signal responding to a response request signal described above and a remote operation signal described below.

A user operates the door switch 24 so as to lock or unlock the doors 31 to 35 of the vehicle 30. When the user operates the door switch 24, the control unit 21 generates a remote operation signal according to the user's operation and transmits the remote operation signal to the vehicle-mounted device 10 using the portable-device transmission unit 23.

The control unit 21 controls the portable-device reception unit 22 and the portable-device transmission unit 23, wirelessly communicates with the vehicle-mounted device 10, and transmits or receives a signal or information to or from the vehicle-mounted device 10.

The remote operation signal or the response signal transmitted from the portable device 20 to the vehicle-mounted device 10 by the portable-device transmission unit 23 includes data such as a unique ID (identification information) of the portable device 20 and the like. In addition, the response signal also includes a value of a reception intensity of each of the response request signals measured by the signal intensity measurement unit 21b described above.

When the vehicle-mounted-device reception unit 3 receives the remote operation signal transmitted from the portable device 20, the control unit 1 of the vehicle-mounted device 10 authenticates the portable device 20 based on an ID of the portable device 20 included in the remote operation signal. Specifically, the control unit 1 of the vehicle-mounted device 10 compares the ID of the portable device 20 included in the remote operation signal with an ID of the vehicle-mounted device 10 previously stored.

If both of the IDs match to each other, the control unit 1 determines that authentication of the portable device 20 succeeds, permits control of the door lock device 5 based on the remote operation signal described above, and locks or unlocks the doors of the vehicle 30 (Keyless Entry Method).

In addition, if the user carrying the portable device 20 approaches the vehicle 30 and the passive request switch 4 is operated, for example, the control unit 1 of the vehicle-mounted device 10 transmits the first response request signal, the second response request signal, and the third response request signal in order of the first response request signal, the second response request signal, and the third response request signal by each of the vehicle-mounted-device transmission units 2. If the portable-device reception unit 22 receives each of the response request signals, the control unit 21 of the portable device 20 measures an intensity (RSSI value) of each of the response request signals by the signal intensity measurement unit 21b every time the portable-device reception unit 22 receives each of the response request signals. The control unit 21 transmits a response signal including each of the measured intensity values and an ID of the portable device 20 to the vehicle-mounted device 10 using the portable-device transmission unit 23. If the vehicle-mounted-device reception unit 3 receives the response signal, the control unit 1 of the vehicle-mounted device 10 determines a magnitude relationship between an intensity difference of any two among intensity values of the response request signals included in the response signal and a predetermined threshold value. In addition, the control unit 1 authenticates the portable device 20 based on an ID of the portable device 20 included in the response signal. Based on a determination result of the magnitude relationship, and an authentication result of the portable device 20, the control unit 1 permits control of the door lock device 5 and locks or unlocks the doors of the vehicle 30 or prohibits control of the door lock device 5 and holds a lock or unlock state of the doors of the vehicle 30 (Passive Entry Method). The control unit 1 is an example of "determination unit" of one or more embodiments of the invention.

Next, an operation of the vehicle-mounted device 10 and the portable device 20 will be described in detail with reference to FIG. 5. In the following description, an operation in a case of a passive entry method will be described as an example.

Figure 5:
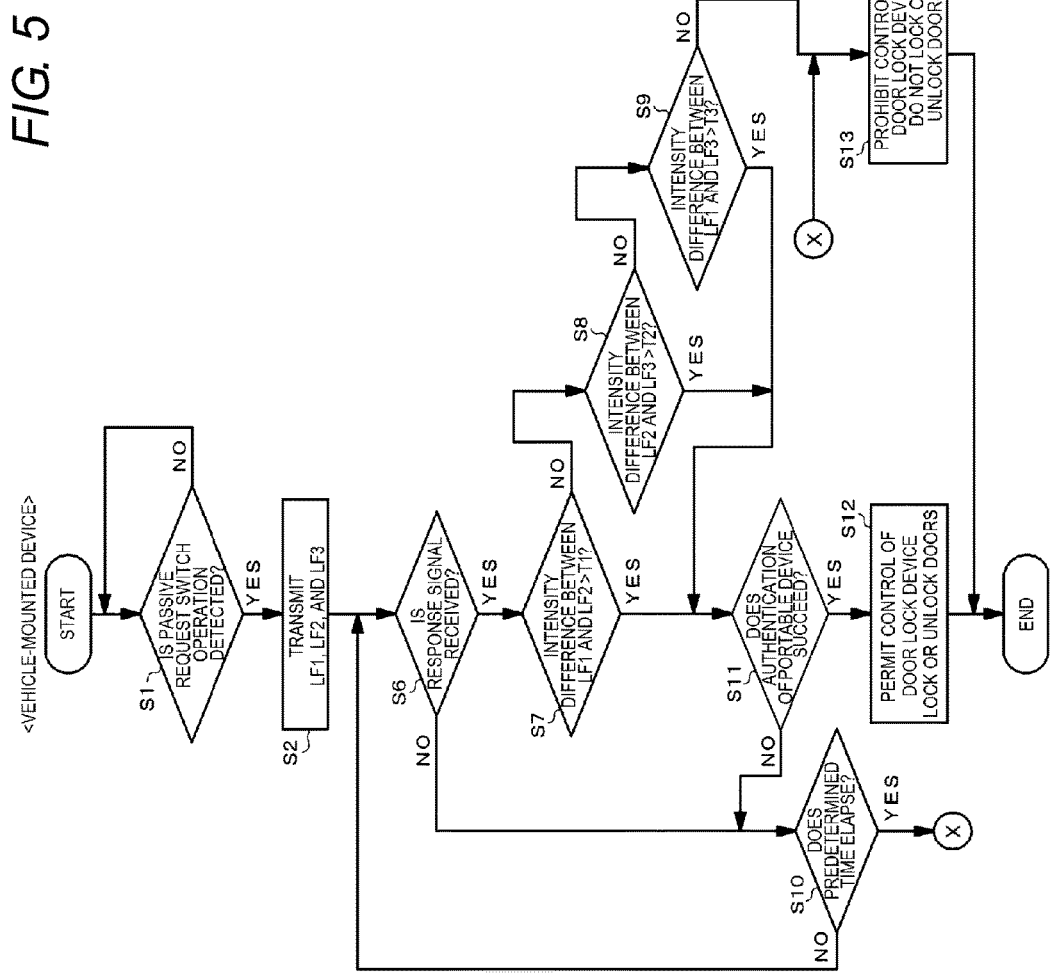
FIG. 5 is a flowchart illustrating an operation of a vehicle-mounted device and a portable device according to Embodiment 1.

FIG. 5 is a flowchart illustrating an operation of the vehicle-mounted device 10 and the portable device 20 according to Embodiment 1. When the portable device 20 is present outside the vehicle compartment of the vehicle 30, if a user operates one of the passive request switches 4, the control unit 1 of the vehicle-mounted device 10 detects the operation (YES in step 51). Then, the control unit 1 transmits the first response request signal, the second response request signal, and the third response request signal using the vehicle-mounted-device transmission unit 2 in order of the first response request signal, the second response request signal, and the third response request signal (step S2).

When the portable device 20 receives the first response request signal, the second response request signal, and the third response request signal by the portable-device reception unit 22 (step S3), the signal intensity measurement unit 21b measures an intensity of each of the response request signals (step S4). Then, the control unit 21 transmits a response signal (RF signal) including an intensity value of each of the measured response request signals and an ID of the portable device 20 using the portable-device transmission unit 23 (step S5).

In the vehicle-mounted device 10, after the vehicle-mounted-device transmission unit 2 transmits each of the response request signals, the vehicle-mounted-device reception unit 3 receives a response signal within a predetermined time (YES in step S6). In this case, the control unit 1 calculates an intensity difference between the first response request signal and the second response request signal among the intensity values of the response request signals included in the response signal and determines whether or not the difference is larger than a predetermined threshold value T1 (step S7).

At this time, if the intensity difference between the first response request signal and the second response request signal is equal to or smaller than the threshold value T1 (NO in step S7), the control unit 1 calculates an intensity difference between the second response request signal and the third response request signal and determines whether or not the difference is larger than a predetermined threshold value T2 (step S8). At this time, if the intensity difference between the second response request signal and the third response request signal is equal to or smaller than the threshold value T2 (NO in step S8), the control unit 1 calculates an intensity difference between the first response request signal and the third response request signal and determines whether or not the difference is larger than a predetermined threshold value T3 (step S9).

If the intensity difference between the first response request signal and the third response request signal is equal to or smaller than the threshold value T3 (NO in step S9), the control unit 1 prohibits control of the door lock device 5 and does not lock or unlock the doors 31 to 35 (step S13).

On the other hand, it is assumed that any one of a first condition in which the intensity difference between the first response request signal and the second response request signal is larger than the threshold value T1 (YES in step S7), a second condition in which the intensity difference between the second response request signal and the third response request signal is larger than the threshold value T2 (YES in step S8), and a third condition in which the intensity difference between the first response request signal and the third response request signal is larger than the threshold value T3 (YES in step S9) is satisfied. In this case, the control unit 1 authenticates the portable device 20 based on the response signal received from the portable device 20.

At this time, the control unit 1 compares the ID of the portable device 20 included in the received response signal with an ID of the vehicle-mounted device 10 previously stored. If both of the IDs match to each other, the control unit 1 determines that authentication of the portable device 20 succeeds (YES in step 511), permits control of the door lock device 5, and locks or unlocks the doors 31 to 35 (step S12).

On the other hand, after the vehicle-mounted-device transmission unit 2 transmits a response request signal, a response signal is not received (NO in step S6) and a predetermined time elapses (YES in step S10). Alternatively, even though the response signal is received (YES in step S6), since the ID of the portable device 20 included in the response signal and the ID of the vehicle-mounted device 10 do not match to each other, the authentication of the portable device 20 does not succeed (NO in step S11) and the predetermined time elapses (YES in step S10). In this case, the control unit 1 prohibits control of the door lock device 5 and does not lock or unlock the doors 31 to 35 (step S13).

Next, an effect of the vehicle communication system 100 described above will be described with reference to FIGS. 6 to 8.

Figure 6:
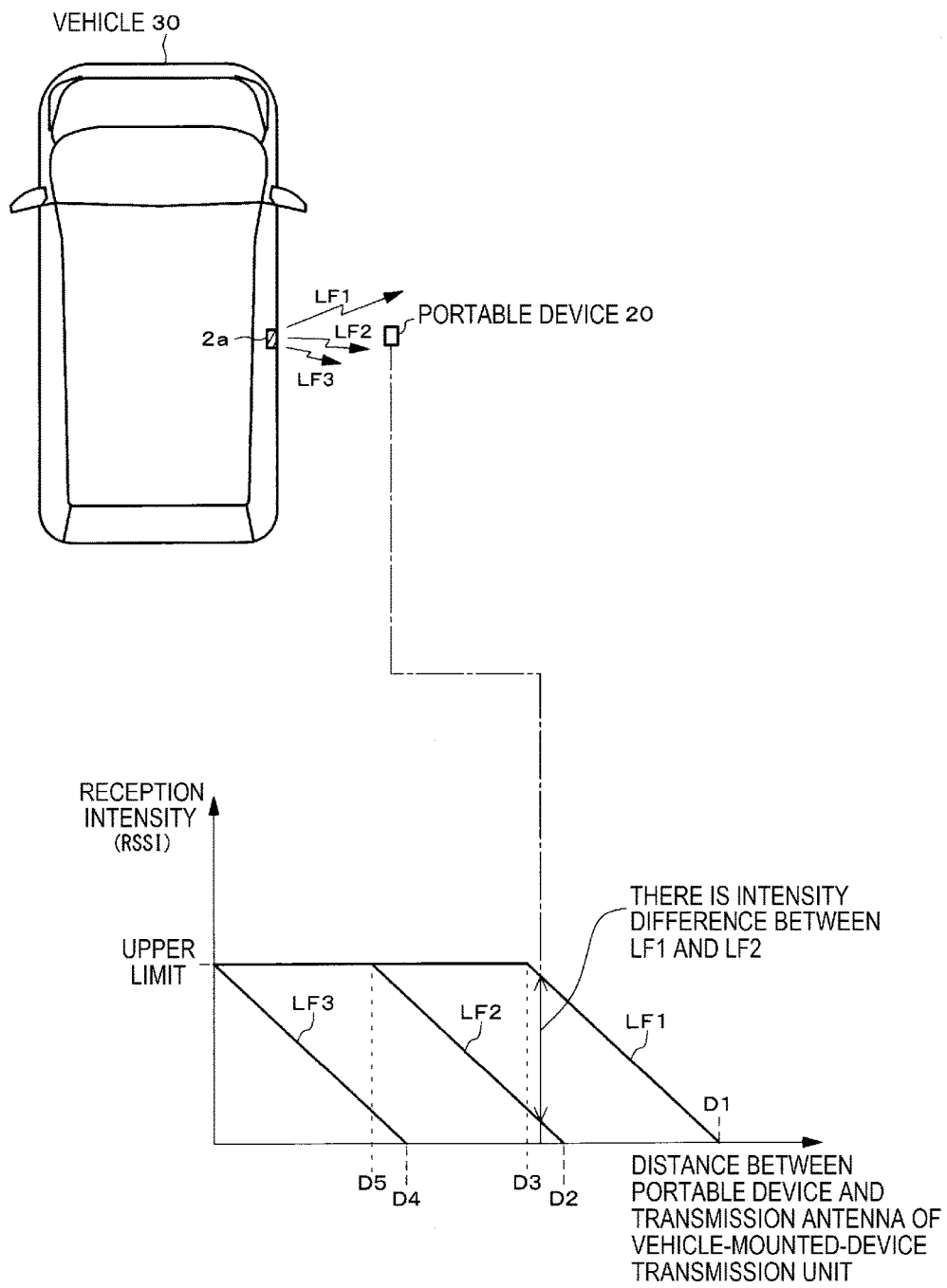
FIG. 6 is a diagram illustrating a communication state of the vehicle-mounted device and the portable device in FIG. 1 and a reception intensity of a response request signal measured by the portable device.
Figure 7:
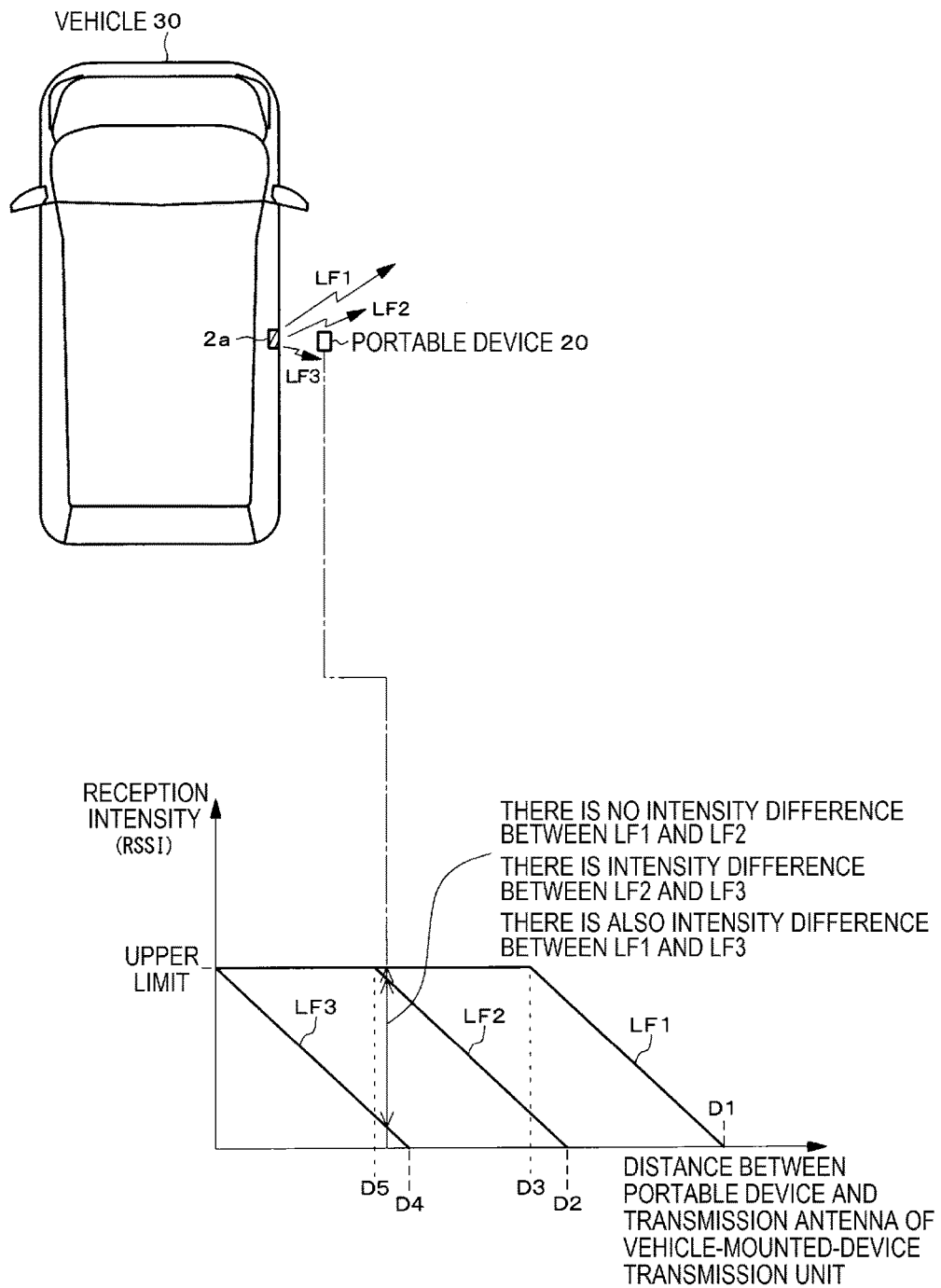
FIG. 7 is a diagram illustrating a communication state of the vehicle-mounted device and the portable device in FIG. 1 and a reception intensity of a response request signal measured by the portable device.

FIGS. 6 to 8 are diagrams illustrating a communication state of the vehicle-mounted device 10 and the portable device 20 and a reception intensity of a response request signal measured by the portable device 20.

In the vehicle communication system 100 described above, the vehicle-mounted device 10 transmits the first response request signal, the second response request signal, and the third response request signal of which intensities are weakened in order of the first response request signal, the second response request signal, and the third response request signal and the portable device 20 measures an intensity of each of the response request signals. In a case where an intensity difference between any two of the response request signals is larger than a corresponding threshold value, the vehicle-mounted device 10 permits control of the door lock device 5 and the doors 31 to 35 of the vehicle 30 is locked or unlocked.

For this reason, as illustrated in FIG. 6, for example, the portable device 20 approaches the vehicle 30, a distance between the portable device 20 and the transmission antenna 2a of the vehicle-mounted device 10 is shorter than the separation distance D1 and is longer than the separation distance D4, and thus an intensity difference between the first response request signal LF1 and the second response request signal LF2 becomes larger than the threshold value T1. In this case, control of the door lock device 5 is permitted and the doors 31 to 35 of the vehicle 30 are locked or unlocked.

In addition, as illustrated in FIG. 7, for example, the portable device 20 more approaches the vehicle 30, a distance between the portable device 20 and the transmission antenna 2a of the vehicle-mounted device 10 is shorter than the separation distance D4, and thus an intensity difference between the first response request signal LF1 and the second response request signal LF2 is equal to or smaller than the threshold value T1. However, since there is a difference in intensities of any two of the response request signals between the second response request signal LF2 and the third response request signal LF3 or between the first response request signal LF1 and the third response request signal LF3, the intensity difference becomes larger than the threshold values T2 and T3. For this reason, even when the portable device 20 approaches the vehicle-mounted device 10, control of the door lock device 5 is permitted and the doors 31 to 35 of the vehicle 30 are locked or unlocked, so that it is possible to improve convenience of the user.

In addition, the vehicle-mounted device 10 consecutively transmits the first response request signal LF1, the second response request signal LF2, and the third response request signal LF3, the portable device 20 measures an intensity of each of the response request signals, and the vehicle-mounted device 10 receiving the measurement result compares an intensity difference between any two of the response request signals with a threshold value. For this reason, after performing a series of the processes once, it is unnecessary to perform again (retry) the series, and it is possible to improve communication responsiveness between the vehicle-mounted device 10 and the portable device 20.

In addition, as illustrated in FIG. 8, for example, in a case where a relay attack is performed using a repeater, even if the repeater relays the three response request signals LF1 to LF3 between the vehicle-mounted device 10 and the portable device 20, an intensity of each of the response request signals cannot be reproduced. For this reason, among the three response request signals LF1 to LF3, there is no intensity difference between any two of the response request signals, control of the door lock device 5 is prohibited, and the doors 31 to 35 are not locked or unlocked. Accordingly, it is possible to improve security of the vehicle 30.

In addition, in the vehicle-mounted device 10, in a case where it is determined that an intensity difference between the first response request signal LF1 and the second response request signal LF2 is larger than the threshold value T1, without comparing an intensity difference of a combination of other two response request signals (LF2 and LF3, and LF1 and LF3) with the threshold values T2 and T3, control of the door lock device 5 is permitted and the doors 31 to 35 are locked or unlocked. Further, even when an intensity difference between the first response request signal LF1 and the second response request signal LF2 is equal to or smaller than the threshold value T1, in a case where it is determined that an intensity difference between the second response request signal LF2 and the third response request signal LF3 is larger than the threshold value T2, without comparing an intensity difference between the first response request signal LF1 and the third response request signal LF3 with the threshold value T3, control of the door lock device 5 is permitted and the doors 31 to 35 are locked or unlocked. For this reason, it is possible to reduce the process in which an intensity difference is compared with a threshold value and to more improve communication responsiveness between the vehicle-mounted device 10 and the portable device 20.

The invention can adopt various embodiments other than the above. For example, in the above embodiment, the portable device 20 measures the intensities of the three response request signals (the first response request signal, the second response request signal, and the third response request signal) transmitted from the vehicle-mounted device 10 and the vehicle-mounted device 10 compares an intensity difference between any two of the three response request signals with the threshold value, but the invention is not limited thereto. In addition to this, as Embodiment 2 illustrated in FIG. 9, for example, after the signal intensity measurement unit 21b of the portable device 20 measures the intensities of the first response request signal, the second response request signal, and the third response request signal (step S4), the control unit 21 of the portable device 20 may compare an intensity difference between the two response request signals with the threshold value (steps S4a to S4c).

The control unit 21 is an example of "determination unit" of one or more embodiments of the invention.

Figure 9:
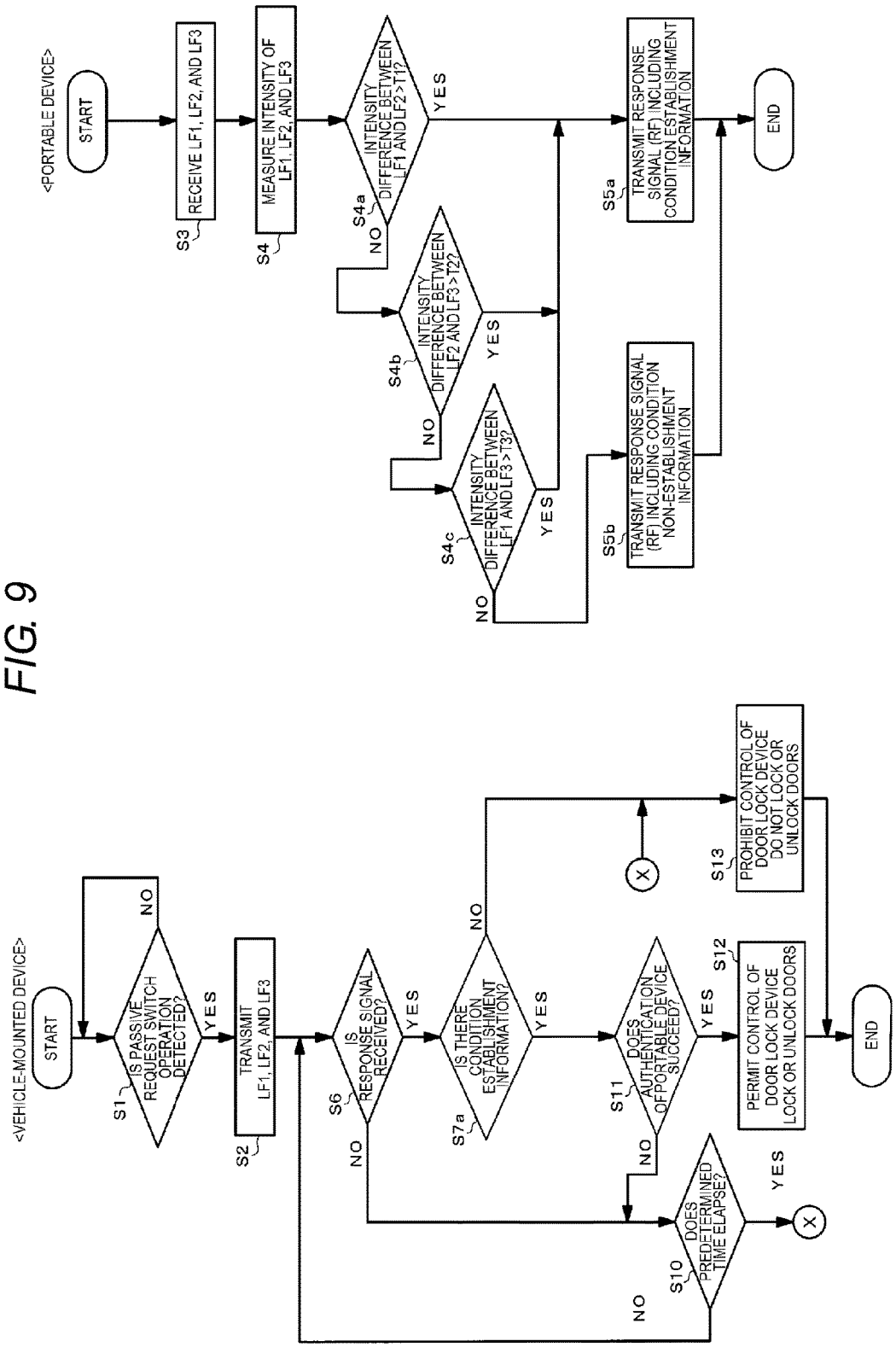
FIG. 9 is a flowchart illustrating an operation of a vehicle-mounted device and a portable device according to Embodiment 2.

In Embodiment 2 of FIG. 9, in a case where it is determined that an intensity difference between any two of the response request signals is larger than a threshold value (YES in step S4a, YES in step S4b, and YES in step S4c), the control unit 21 of the portable device 20 transmits a response signal including condition establishment information indicating the determination result to the vehicle-mounted device 10 using the portable-device transmission unit 23 (step S5a in FIG. 9). In addition, in a case where it is determined that an intensity difference between any two of the response request signals is equal to or smaller than a threshold value (NO in step S4a, NO in step S4b, and NO in step S4c), the control unit 21 transmits a response signal including condition non-establishment information indicating the determination result to the vehicle-mounted device 10 using the portable-device transmission unit 23 (step S5b).

In the vehicle-mounted device 10, if the response signal received by the vehicle-mounted-device reception unit 3 does not include the condition establishment information (NO in step S7a), the control unit 1 prohibits control of the door lock device 5 and does not lock or unlock the doors 31 to 35 (step S13). On the other hand, if the response signal received by the vehicle-mounted-device reception unit 3 includes the condition establishment information (YES in step S7a), after further checking that authentication of the portable device 20 succeeds (YES in step S11), the control unit 1 permits control of the door lock device 5 and locks or unlocks the doors 31 to 35 (step S12). That is, the above-described condition establishment information transmitted from the portable device 20 is an example of "information for permitting control of a target" of one or more embodiments of the invention.

In a case where a relay attack is performed in Embodiment 2 described above, there is a difference between any two of intensities of the response request signals, and thus the doors 31 to 35 of the vehicle 30 are not locked or unlocked and it is possible to improve security. In addition, even in a case where the portable device 20 approaches the vehicle-mounted device 10, there is a difference between any two of intensities of the response request signals, the difference is larger than a threshold value, the doors 31 to 35 are locked or unlocked, and it is possible to improve convenience of the user. Further, after response request signals having different three intensities are consecutively transmitted from the vehicle-mounted device 10, an intensity of each of the response request signals is measured and an intensity difference between any two of response request signals is compared with a threshold value. After performing a series of the processes once, it is unnecessary to perform again and it is possible to improve communication responsiveness when the portable device 20 approaches the vehicle-mounted device 10.

In the above embodiment, the response request signals having different three intensities are transmitted from the vehicle-mounted device 10 and the portable device 20 measures the intensity of each of the response request signals LF1, LF2, and LF3, but the invention is not limited thereto. In addition to this, as Embodiment 3 (FIG. 10) described below, response signals RF1, RF2, and RF3 having different three intensities are transmitted from the portable-device transmission unit 23 of the portable device 20 and the signal intensity measurement unit 1b of the vehicle-mounted device 10 measures an intensity of each of the response signals. The portable-device transmission unit 23 is an example of "transmission unit" of one or more embodiments of the invention. The signal intensity measurement unit 1b is an example of "measurement unit" of one or more embodiments of the invention.

In Embodiment 3 in FIG. 10, when detecting an operation of the passive request switch 4 (YES in step S1), the control unit 1 of the vehicle-mounted device 10 transmits a response request signal (step S2a). When the portable device 20 receives the response request signal by the portable-device reception unit 22 (step S3a), the control unit 21 transmits the first response signal RF1, the second response signal RF2 having an intensity weaker than that of the first response signal, and the third response signal RF3 having an intensity weaker than that of the second response signal by the portable-device transmission unit 23 in order of the first response signal RF1, the second response signal RF2, and the third response signal RF3 (step S5c). At this time, at least one of the response signals includes an ID of the portable device 20. The first response signal is an example of "first radio signal" of one or more embodiments of the invention. The second response signal is an example of "second radio signal" of one or more embodiments of the invention. The third response signal is an example of "third radio signal" of one or more embodiments of the invention.

When the vehicle-mounted device 10 receives each of the response signals RF1 to RF3 by the vehicle-mounted-device reception unit 3 (YES in step S6a), the control unit 1 measures an intensity of each of the response signals RF1 to RF3 by the signal intensity measurement unit 1b (step S6b). Further, the control unit 1 calculates an intensity difference between the two response signals and determines whether or not the difference is larger than predetermined threshold values T1', T2', and T3' (steps S7a, S8a, and S9a). In a case where it is determined that the intensity difference between the two response signals is larger than the threshold values (YES in step S7a, YES in step S8a, and YES in step S9a), the control unit 1 authenticates the portable device 20. If the control unit 1 checks that authentication of the portable device 20 succeeds (YES in step S11), the control unit 1 permits control of the door lock device 5 and locks or unlocks the doors 31 to 35 (step S12). On the other hand, in a case where it is determined that the intensity difference between any two of the response signals is equal to or smaller than the threshold value (NO in step S7a, NO in step S8a, and NO in step S9a), the control unit 1 prohibits control of the door lock device 5 and does not lock or unlock the doors 31 to 35 (step S13).

In the embodiment, in a case where the first condition in which an intensity difference between the first response request signal LF1 and the second response request signal LF2 is larger than a first threshold value T1 is not satisfied, an example, in which success or failure of the second condition in which an intensity difference between the second response request signal LF2 and the third response request signal LF3 is larger than a second threshold value T2 is checked, is described. In addition, in a case where the second condition in which an intensity difference between the second response request signal LF2 and the third response request signal LF3 is larger than the second threshold value T2 is not satisfied, an example, in which success or failure of the second condition in which an intensity difference between the first response request signal LF1 and the third response request signal LF3 is larger than a third threshold value T3 is checked, is described. However, the invention are not limited thereto. For example, success or failure of the three conditions described above may be once or consecutively checked.

In addition, in the above embodiment, after an intensity difference of a response request signal measured by the portable device 20 is compared with a threshold value, the vehicle-mounted device 10 authenticates the portable device 20, but the invention are not limited thereto. In addition to this, for example, after it is checked that authentication of the portable device succeeds, the intensity difference of the response request signal may be compared with the threshold value.

In addition, in the above embodiment, a passive entry method in which a response request signal is transmitted from the vehicle-mounted device 10 in accordance with an operation of the passive request switch 4 is described, but the invention are not limited thereto. In addition to this, for example, one or more embodiments of the invention can apply to a polling method in which response request signals are intermittently transmitted from the vehicle-mounted-device transmission unit 2 at a predetermined period regardless a switch operation.

In addition, as another example, one or more embodiments of the invention can apply to a case where after the portable device 20 transmits a remote operation signal based on an operation of the door switch 24, the vehicle-mounted device 10 receiving the remote operation signal transmits a radio signal (an LF signal) so as to response to the portable device 20.

In addition, in the above embodiment, the three transmission antennas 2a transmit a response request signal to the portable device 20 which is present outside of the vehicle (FIG. 2), the invention is not limited thereto. The number of provided transmission antennas and an installation location may be set as appropriate.

In addition, in the above embodiment, a target which permits or prohibits control is the door lock device 5 which locks or unlocks the doors of the vehicle 30 in the vehicle communication system 100, but the invention is not limited thereto. In addition to this, for example, operations of other vehicle-mounted targets such as a traveling driving device for starting or stopping a traveling driving source (such as an engine) of a vehicle, an air conditioner device for driving an air conditioner of a vehicle, an audio system, an automatic opening and closing device of an opening and closing body such as a door, and the like may be permitted or prohibited.

Further, the above embodiment is applied to the vehicle communication system 100 for an automatic four-wheeled vehicle, the vehicle-mounted device 10, and the portable device 20, but the invention is not limited thereto. For example, the invention can be applied to a vehicle communication system, a vehicle-mounted device, and a portable device for other vehicles such as a motorcycle, a heavy duty vehicle, and the like.

While the invention has been described with respect to a limited number of embodiments, those skilled in the art, having benefit of this disclosure, will appreciate that other embodiments can be devised which do not depart from the scope of the invention as disclosed herein. According, the scope of the invention should be limited only by the attached claims.

The invention claimed is:
1. A vehicle communication system comprising:
a vehicle-mounted device mounted on a vehicle; and
a portable device carried by a user of the vehicle,
wherein control of a target mounted on the vehicle is permitted or prohibited based on a radio signal transmitted or received between the vehicle-mounted device and the portable device, wherein the vehicle communication system further comprises:
- a transmission unit that is provided on one of the vehicle-mounted device and the portable device and performs transmission of a first radio signal, a second radio signal having a transmission intensity weaker than that of the first radio signal, and a third radio signal having a transmission intensity weaker than that of the second radio signal;
- a measurement unit that is provided on the other of the vehicle-mounted device and the portable device and measures a reception intensity of each of the radio signals transmitted from the transmission unit; and
- a determination unit that is provided on the vehicle-mounted device or the portable device and determines whether or not a reception intensity difference between any two of the radio signals among the radio signals measured by the measurement unit is larger than a threshold value, wherein the determination unit first determines whether or not the reception intensity difference between the first radio signal and the second radio signal is larger than a first threshold value; if the reception intensity difference between the first radio signal and the second radio signal is not larger than the first threshold value, then determines whether or not the reception intensity difference between the second radio signal and the third radio signal is larger than a second threshold value; and if it is determined that the reception intensity difference between the second radio signal and the third radio signal is not larger than the second threshold value, then determines whether or not the reception intensity difference between the first radio signal and the third radio signal is larger than a third threshold value;

wherein control of the target is permitted in a case where any one of following conditions is satisfied:
- a first condition in which the reception intensity difference between the first radio signal and the second radio signal is larger than the first threshold value;
- a second condition in which the reception intensity difference between the second radio signal and the third radio signal is larger than the second threshold value; and
- a third condition in which the reception intensity difference between the first radio signal and the third radio signal is larger than the third threshold value;

wherein, as the portable device and the vehicle-mounted device gets closer, the reception intensities of the radio signals increase until being saturated at an upper limit; and wherein the transmission intensities of the first, second, and third radio signals are set such that:
- $D2>D3$, where $D2$ denotes a first separation distance at which the reception intensity of the second radio signal becomes non-zero, and $D3$ denotes a first saturation distance at which the reception intensity of the first radio signal reaches the upper limit;
- $D4>D5$, where $D4$ denotes a second separation distance at which the reception intensity of the third radio signal becomes non-zero, and $D5$ denotes a second saturation distance at which the reception intensity of the second radio signal reaches the upper limit; and
- the reception intensity of the third radio signal is always lower than the upper limit as the portable device approaches the vehicle-mounted device.

2. A vehicle-mounted device that is mounted on a vehicle and permits or prohibits control of a target mounted on the vehicle based on a radio signal transmitted or received to or from a portable device carried by a user of the vehicle, the vehicle-mounted device comprising:
- a vehicle-mounted-device transmission unit that performs transmission of a first radio signal, a second radio signal having a transmission intensity weaker than that of the first radio signal, and a third radio signal having a transmission intensity weaker than that of the second radio signal;
- a vehicle-mounted-device reception unit that receives, from the portable device, a response signal containing a reception intensity of each of the radio signals measured when the portable device receives each of the radio signals; and
- a determination unit that determines whether or not a reception intensity difference between any two of the radio signals among the radio signals contained in the response signal is larger than a threshold value, wherein the determination unit first determines whether or not the reception intensity difference between the first radio signal and the second radio signal is larger than a first threshold value; if the reception intensity difference between the first radio signal and the second radio signal is not larger than the first threshold value, then determines whether or not the reception intensity difference between the second radio signal and the third radio signal is larger than a second threshold value; and if it is determined that the reception intensity difference between the second radio signal and the third radio signal is not larger than the second threshold value, then determines whether or not the reception intensity difference between the first radio signal and the third radio signal is larger than a third threshold value; and wherein control of the target is permitted in a case where any one of following conditions is satisfied:
- a first condition in which the reception intensity difference between the first radio signal and the second radio signal is larger than the first threshold value;
- a second condition in which the reception intensity difference between the second radio signal and the third radio signal is larger than the second threshold value;
- a third condition in which the reception intensity difference between the first radio signal and the third radio signal is larger than the third threshold value;

wherein, as the portable device and the vehicle-mounted device gets closer, the reception intensities of the radio signals increase until being saturated at an upper limit; and wherein the transmission intensities of the first, second, and third radio signals are set such that:
- $D2>D3$, where $D2$ denotes a first separation distance at which the reception intensity of the second radio signal becomes non-zero, and $D3$ denotes a first saturation distance at which the reception intensity of the first radio signal reaches the upper limit;
- $D4>D5$, where $D4$ denotes a second separation distance at which the reception intensity of the third radio signal becomes non-zero, and $D5$ denotes a second saturation distance at which the reception intensity of the second radio signal reaches the upper limit; and
- the reception intensity of the third radio signal is always lower than the upper limit as the portable device approaches the vehicle-mounted device.

3. A portable device that is carried by a user of a vehicle and transmits and receives a radio signal for permitting or prohibiting an operation of a target mounted on the vehicle to and from a vehicle-mounted device mounted on the vehicle, the portable device comprising:
- a measurement unit that measures reception intensities of a first radio signal, a second radio signal having a transmission intensity weaker than that of the first radio signal, and a third radio signal having a transmission intensity weaker than that of the second radio signal, when the first radio signal, the second radio signal and the third radio signal transmitted from the vehicle-mounted device are received;
- a portable-device transmission unit that transmits, to the vehicle-mounted device, a response signal including information for permitting control of the target or a response signal including a measurement result of the measurement unit in a case where any one of following conditions is satisfied:
  - a first condition in which a reception intensity difference between the first radio signal and the second radio signal is larger than a first threshold value,
  - a second condition in which a reception intensity difference between the second radio signal and the third radio signal is larger than a second threshold value, and
  - a third condition in which a reception intensity difference between the first radio signal and the third radio signal is larger than a third threshold value; and
- a determination unit that determines whether or not each of the conditions is satisfied, wherein the determination unit first determines whether or not the reception intensity difference between the first radio signal and the second radio signal is larger than the first threshold value; if the reception intensity difference between the first radio signal and the second radio signal is not larger than the first threshold value, then determines whether or not the reception intensity difference between the second radio signal and the third radio signal is larger than the second threshold value; and if it is determined that the reception intensity difference between the second radio signal and the third radio signal is not larger than the second threshold value, then determines whether or not the reception intensity difference between the first radio signal and the third radio signal is larger than the third threshold value;

wherein, as the portable device and the vehicle-mounted device gets closer, the reception intensities of the radio signals increase until being saturated at an upper limit; and wherein the transmission intensities of the first, second, and third radio signals are set such that:
- $D2>D3$, where $D2$ denotes a first separation distance at which the reception intensity of the second radio signal becomes non-zero, and $D3$ denotes a first saturation distance at which the reception intensity of the first radio signal reaches the upper limit;
- $D4>D5$, where $D4$ denotes a second separation distance at which the reception intensity of the third radio signal becomes non-zero, and $D5$ denotes a second saturation distance at which the reception intensity of the second radio signal reaches the upper limit; and
- the reception intensity of the third radio signal is always lower than the upper limit as the portable device approaches the vehicle-mounted device.

* * * * *